Sept. 14, 1954  E. G. BAILEY ET AL  2,688,942
STEAM GENERATING AND COMBUSTION SYSTEM AND METHOD THEREOF
Filed April 9, 1949  7 Sheets-Sheet 1

INVENTORS
*Ervin G. Bailey &*
BY *Ralph M. Hardgrove*
ATTORNEY

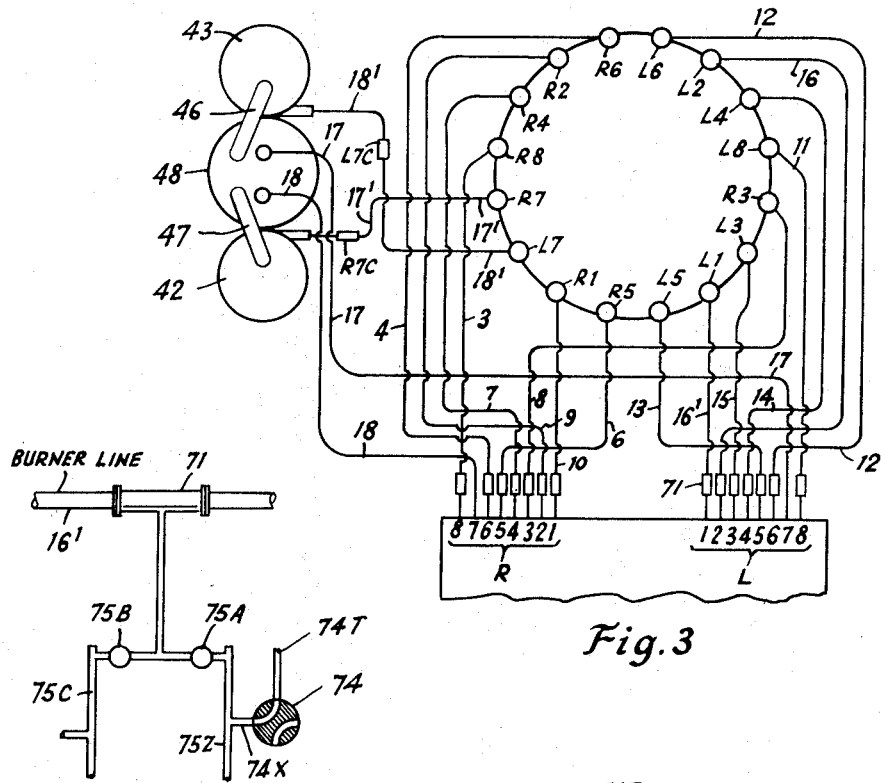
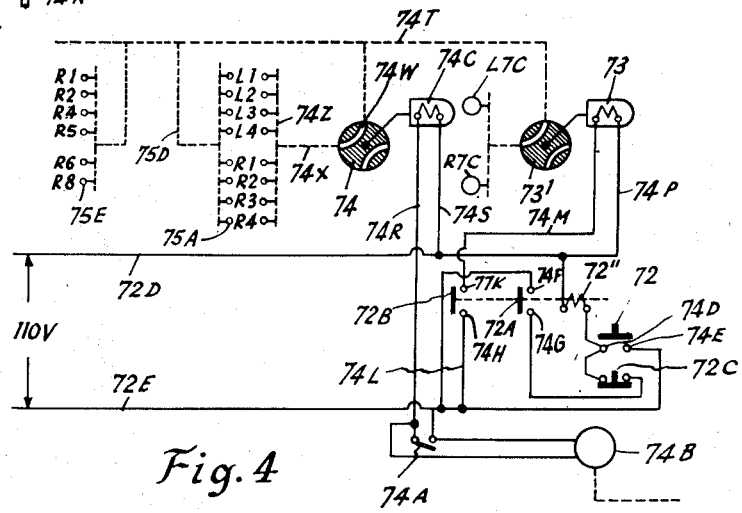
Fig. 3
Fig. 5
Fig. 4
INVENTORS
Ervin G. Bailey &
BY Ralph M. Hardgrove
ATTORNEY

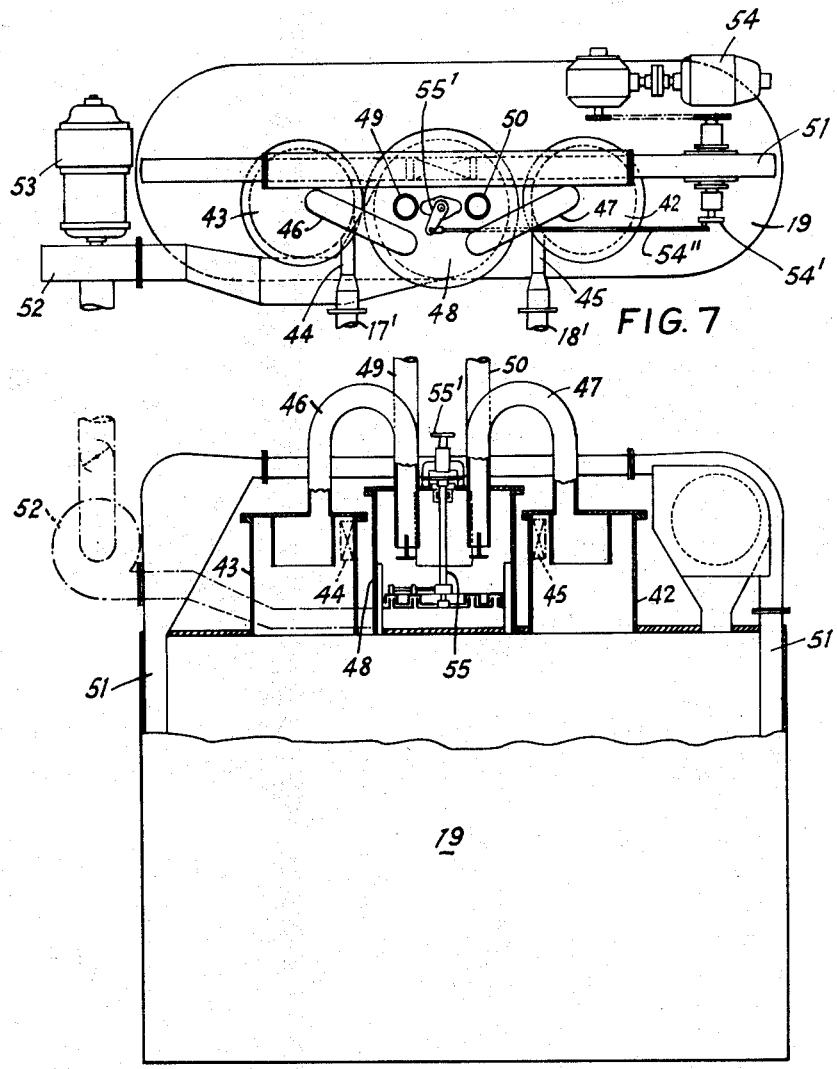

INVENTORS
Ervin G. Bailey &
BY Ralph M. Hardgrove
/ATTORNEY

Sept. 14, 1954   E. G. BAILEY ET AL   2,688,942
STEAM GENERATING AND COMBUSTION SYSTEM AND METHOD THEREOF
Filed April 9, 1949   7 Sheets-Sheet 6

INVENTORS
Ervin G. Bailey &
BY Ralph M. Hardgrove

ATTORNEY

INVENTORS
Ervin G. Bailey &
BY Ralph M. Hardgrove
/ATTORNEY

Patented Sept. 14, 1954

2,688,942

UNITED STATES PATENT OFFICE 2,688,942

STEAM GENERATING AND COMBUSTION SYSTEM AND METHOD THEREOF

Ervin G. Bailey, Easton, Pa., and Ralph M. Hardgrove, Canton, Ohio, assignors to The Babcock & Wilcox Company, New York, N. Y., a corporation of New Jersey Application April 9, 1949, Serial No. 86,576

4 Claims. (Cl. 110—103)

The present invention relates to a method of and apparatus for firing a furnace with pulverized fuel, and more particularly relates to a method of, and a system for, preparing and supplying pulverized coal to a locomotive boiler furnace. This application is a continuation-in-part of our co-pending application, Serial No. 544,606, filed July 12, 1944.

In firing a locomotive boiler furnace with pulverized coal many problems arise which are similar to the problems encountered in stationary practice. For example, the combustion of the fuel must be completed within the furnace to avoid undesirable carbon loss, ignition of the coal must be stable to avoid loss of combustion under low load conditions, and proper provision must be made for disposal of the incombustible ash constituents in the coal. These problems are greatly accentuated in locomotive service due to the particular circumstances surrounding this field of pulverized coal firing. Fundamentally, a good share of the increased difficulties are caused by physical limitations in the space available for the pulverized coal firing and power generating equipment. A high steam capacity in the limited space of a railroad locomotive is basically a problem in combustion and heat transfer, but its solution is greatly simplified by the delivery to the burners of pulverized coal at a sustained high fineness, with the proper proportion of combustion air, and in accurately and easily controlled quantities in accordance with the power and furnace requirements.

A further problem more peculiar to railroad operation relates to the frequent and wide variation in the locomotive power requirements. Ordinarily, a road locomotive will operate through a load range starting with an idling load wherein the furnace fuel requirements need be only sufficient to maintain boiler pressure and to compensate for radiation losses, to full capacity. Within this load range the furnace requirements will alter with track conditions, such as grades and curves, and with traffic conditions. Thus, the fuel supply must be capable of great flexibility in delivery of fuel to the furnace, and capable of immediate response to the control of the operator. In addition, since a locomotive is likely to spend a portion of its time of service availability in the yard or on a siding without the necessity for maintaining steam pressure, the unit must be capable of starting from a cold condition without the benefits of outside heat or power.

Although the problems of fuel preparation and utilization are intimately related in the application of pulverized coal firing to a railroad locomotive, the present invention is specfically directed toward the pulverized coal preparation equipment, its mode of operation, and the controls necessary for its proper utilization in locomotive service.

In accordance with our invention, we provide a system of pulverized coal preparation and supply that is capable of delivering fuel to a locomotive boiler furnace under all conditions of operational requirements. This is accomplished by the use of a direct firing pulverizer which pulverizes coal and delivers the prepared fuel to the furnace in accordance with heat requirements over a predetermined relatively high capacity range. Simultaneously with the delivery of fuel to the furnace, a predetermined quantity of fuel is delivered by the pulverizer to a storage space. The storage space is limited in capacity and is preferably maintained in a filled condition during the periods of pulverizer operation.

When the furnace load requirements are below the selected minimum capacity range of the direct fired pulverizer the latter is shut down and stored pulverized coal is delivered to the furnace from an aerating feeder. This operation is automatically controlled so that the delivery of airborne fuel to the furnace from either the pulverizer or from storage is regulated in accordance with furnace requirements. Ordinarily the areator feeder is operated at low capacity, which is approximately equal to no-load furnace conditions, but the aerator feeder can be arranged to deliver a controlled variation of pulverized fuel as dictated by furnace requirements. When the furnace load increases beyond the capacity of the areating feeder the pulverizer is automatically started to supply pulverized coal directly to the furnace, the areating feeder is stopped and again pulverized coal is delivered to the aerating feeder storage space to replenish the stored supply of pulverized coal. Such a sequence of furnace operation, alternating between pulverized coal supply from the pulverizer and from the areating feeder, may be continued indefinitely to maintain the furnace and boiler at an operating capacity. Throughout the cycle of fuel delivery the pulverizer and areating feeder are regulated so as to overlap in their delivery of fuel to the furnace so that combustion is maintained within the furnace during the periods of change-over from one to the other as the source of fuel supply.

The principal object of the present invention is to provide a method of and apparatus for the preparation and supply of pulverized fuel to a boiler furnace. A further and more specific object is to provide a method of and apparatus for the delivery of airborne pulverized coal to a locomotive boiler furnace over a wide capacity range wherein the source of pulverized coal is a direct firing pulverizer over a predetermined upper capacity range and an areating feeder operative to supply stored pulverized coal at predetermined lower furnace fuel requirements.

An additional object is the provision of a system of automatic controls for the regulation of the fuel flow to a locomotive boiler furnace in response to the furnace fuel requirements as determined by the steam pressure in the locomotive boiler. A further object is to provide apparatus of the character described which is capable of automatic regulation, with the source of fuel for a locomotive boiler furnace being supplied from either storage or by direct firing, depending upon the rate of fuel delivery to the furnace, while still maintaining fuel combustion within the furnace.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described an embodiment of our invention.

In the drawings:

Fig. 3 is a diagrammatic view showing an arrangement of the pulverizer, aerator, steam generator furnace burners, and the fuel lines connecting those components;

Fig. 4 is a diagrammatic view illustrating a part of a control system for initiating the firing of the steam generator and controlling the firing at different loads and with different arrangements of burners relative to the number of burners supplied directly from the pulverizer and the number supplied by the aerators from pulverized fuel storage;

Fig. 5 is a detailed view indicating the manner in which one of the valves such as L–1 of Fig. 4 is arranged with reference to a valve controlled thereby and disposed in a burner line;

Fig. 6 is a vertical section through an aerator involving a storage bin and an aerating feeder for delivering aerated pulverized fuel from storage to burners;

Fig. 7 is a plan of the aerator indicated in Fig. 6;

Figure 10:
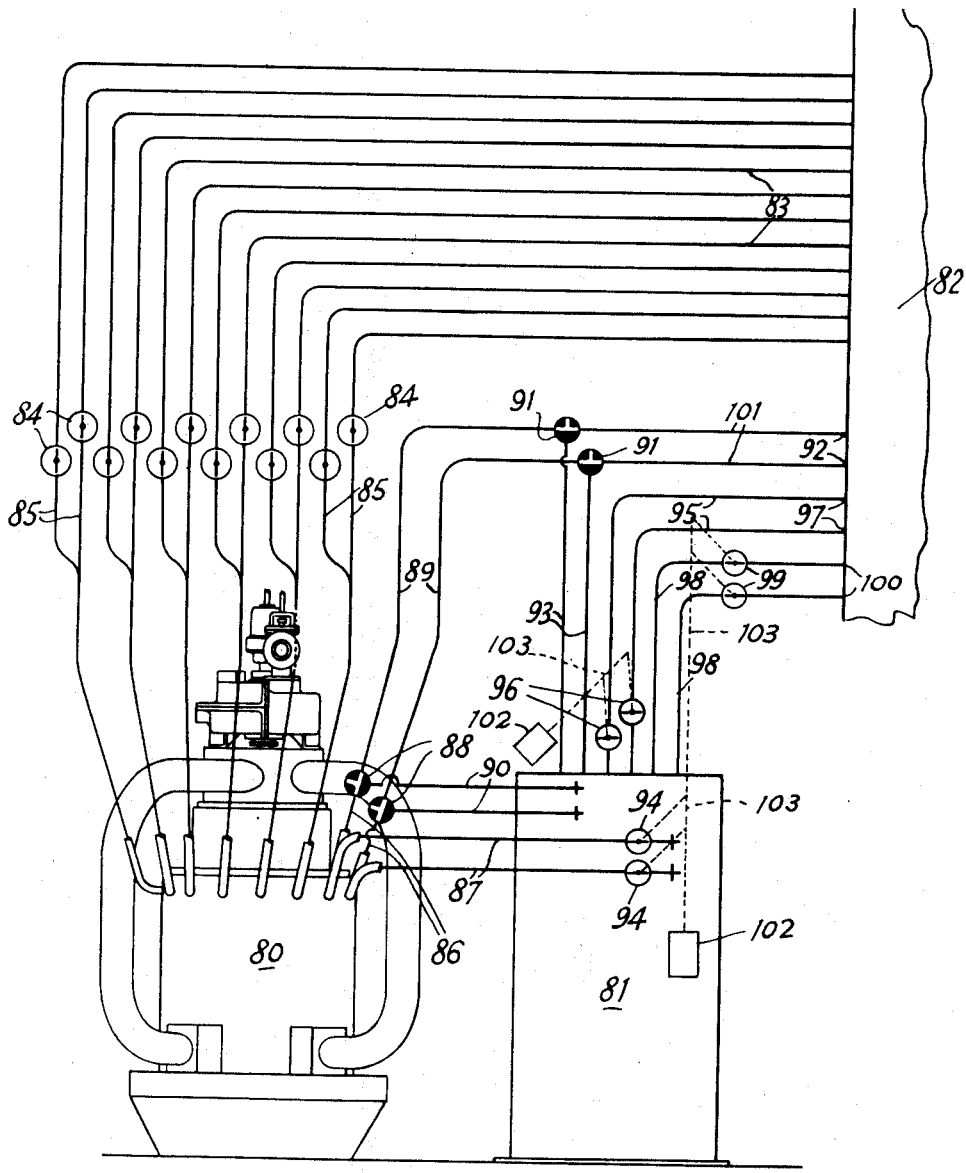
Figure 11:
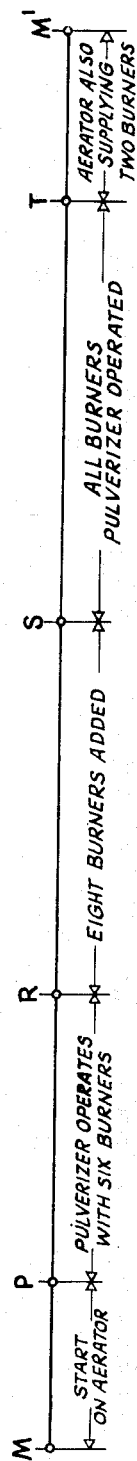
Figure 12:
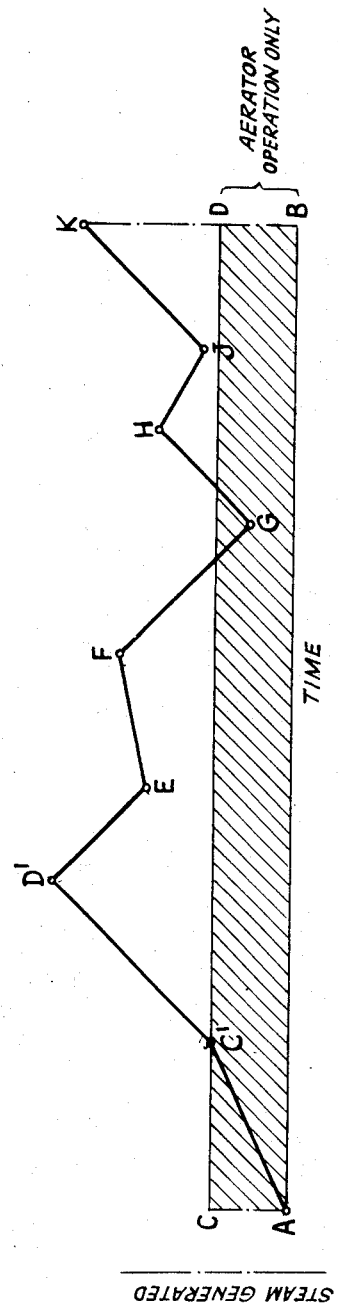

Fig. 10 is a diagrammatic view showing an arrangement of pulverizer, aerator, furnace burners, and a number of burner conduit lines supplying fuel to the burners either directly from the pulverizer or from the aerator. This figure and its descriptive subject matter is copied from our pending patent application, Ser. No. 544,606 of July 12, 1944, as a result of a requirement for division in the parent application;

Fig. 11 is a diagram indicating the conditions involved in successive steps in the operation of the illustrative system; and Fig. 12 is a diagram illustrating successive operative train and system conditions as related to different positions on a multiple notch engineman's controller.

The present invention includes, in general, apparatus for the preparation and delivery of airborne pulverized coal to a steam generator furnace 2 wherein an upper range of furnace fuel requirements is directly supplied by an air-swept pulverizer 1 through suitable burner pipes 3, 4, and 6–16', inclusive, and the lower range of furnace fuel requirements, as in starting up, is supplied from a pulverized coal storage space (bin 19) by an aerating feeder 20 through separate burner pipes 17 and 18. In such an arrangement the supply of stored pulverized coal is replenished during periods of pulverizer operation while the pulverizer is supplying fuel to the furnace. The operation of the pulverizer and the aerating feeder is automatically regulated in response to the fuel requirements of the furnace so that combustion may be maintained in the furnace over a wide range of fuel requirements.

As shown in the drawings, the invention is illustrated as applied to a railroad locomotive boiler furnace 2 wherein the furnace, and the coal preparation equipment are mounted upon one car 21 of a multi-car locomotive. A second car 22, or tender, is provided for the raw coal and water storage reservoirs. The pulverizer and aerator, with their drives, are mounted at the end of the car adjacent the coupled end of the tender. Since the raw coal reservoir and the pulverized coal preparation equipment are mounted upon separate cars it is necessary for the raw coal conveyor therebetween to be mounted for coal delivery while the locomotive is operating on a curved section of track. This is accomplished as hereinafter described by means of a cross-conveyor arranged to receive coal from a raw coal conveyor and to discharge into the pulverizer feed spout.

Figure 1:
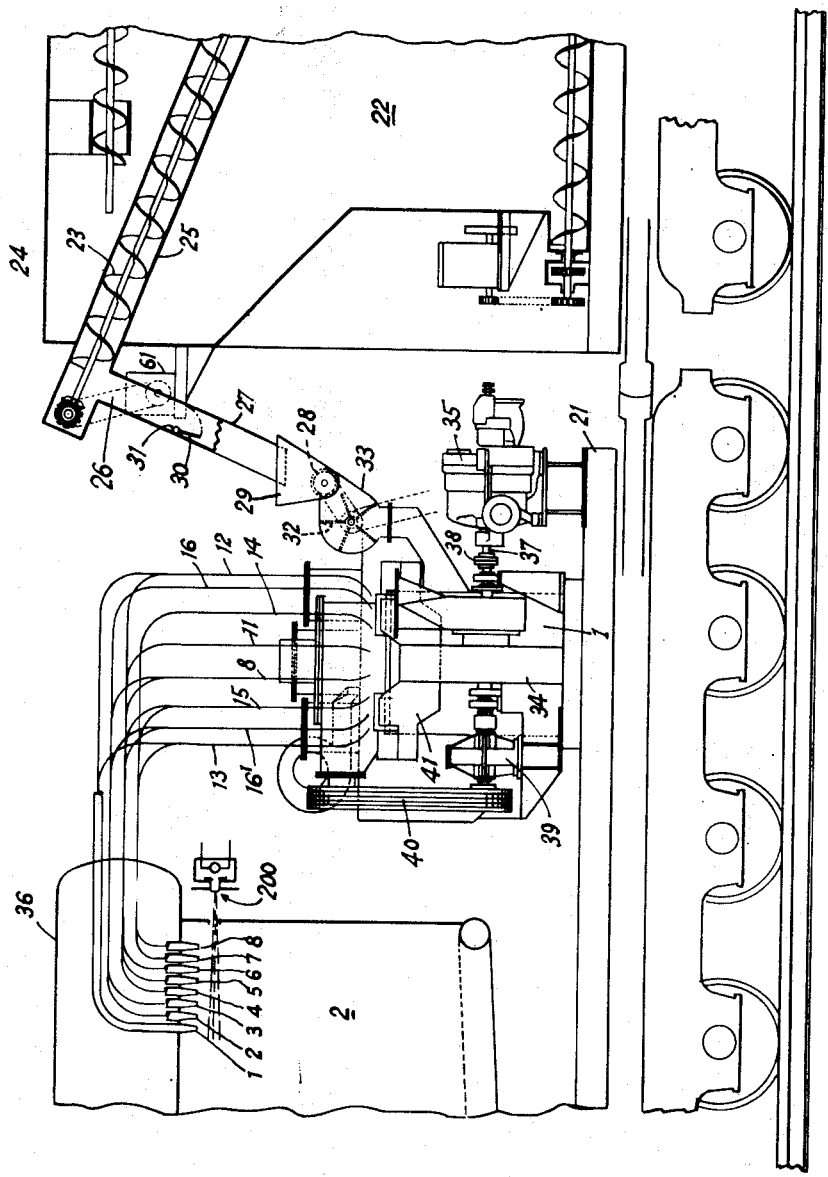
Fig. 1 is a partial view in the nature of a side elevation showing an arrangement of the illustrative pulverized fuel system as co-ordinated with the units of a railway locomotive.
Figure 2:
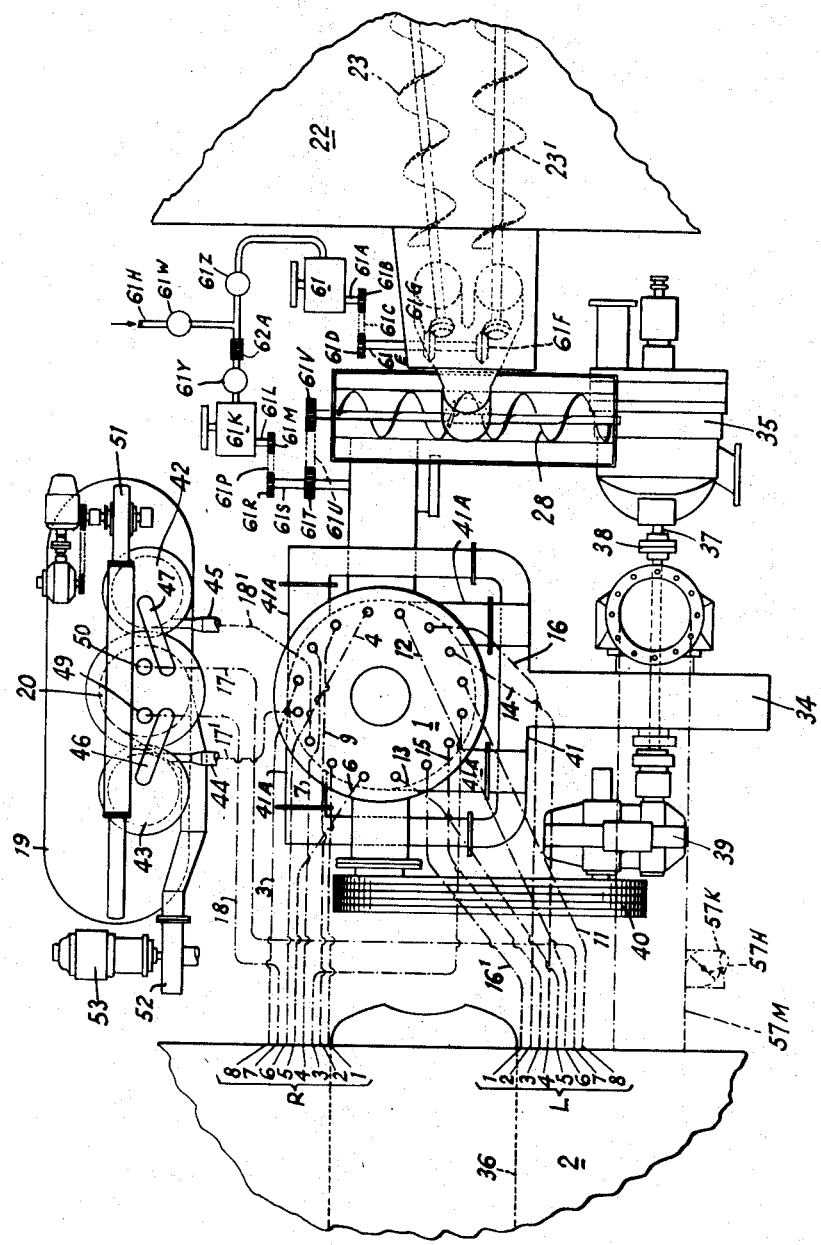
Fig. 2 is a partial plan of the arrangement shown in Fig. 1, indicating the pulverizer and a part of the steam generator on one railway car and a part of a tender with its fuel delivering equipment on a car coupled therewith.

The discharge end of the raw coal conveyor 23 is shown in Figs. 1 and 2, and this mechanism is more fully disclosed and claimed in our copending application, Serial No. 86,173, filed April 8, 1949. The mechanism includes a pair of screw conveyors 23, upwardly inclined and arranged to converge at a discharge position adjacent the roof 24 of the tender. Each screw conveyor is suitably enclosed in a housing 25 with an outlet 26 at the top of a chute or conduit 27 leading downwardly to a cross-conveyor 28. The cross-conveyor consists of a screw operated in an open top trough 29 with a lower discharge opening at one end thereof. The cross-conveyor and the inclined feed screws 23 are driven by a steam engine which is regulated as hereinafter described to control the rate of raw coal delivery therethrough. The length of the cross-conveyor is selected in accordance with the minimum radius of track curvature so that the raw coal delivered by the feed screws will always be received by the conveyor. The down chute or conduit 27 has mounted therein a flap valve or paddle 30, pivoted at 31 and preferably spring loaded to return to a horizontal position for alarm purposes if the downward flow of fuel ceases at any time.

Since the pulverizer is operated under positive pressure, a feeder seal is provided for the pulverizer. In the embodiment shown, the feeder seal includes the multiple pocket or star wheel 32 which rotates with close clearances within its housing 33. The feeder receives the raw coal delivered thereto by the cross conveyor and discharges the coal into the pulverizer 1. The drive for the feeder is co-ordinated with the drive which operates the inclined screw conveyors 23 and 23' and the cross conveyor 28.

As shown in Fig. 2 the steam engine 61 operates through the power transmitting components 61A, 61B, 61C, 61D, 61E, 61F, and 61G to drive the screw conveyors 23 and 23'. This engine receives steam from the same line 61H which supplies the engine 61K arranged to drive both the cross conveyor 28 and the feeder 32 through driving components 61P, 61L, 62R, 61S, 61T, 61U, and 61V. Steam flow to both engines is controlled by the operation of valves 61W, 61Y and 61Z. By appropriate valve control the speeds of the engines may be varied independently, or otherwise. When the engine 61K is fixedly mounted on the pulverizer unit or carriage, that part of the steam line leading to the engine has a flexible section such as 62A.

The pulverizer 1 and the primary air fan 34 are driven by a steam turbine 35 which receives superheated steam from the locomotive boiler, the steam and water drum 36 of which is partially shown in Fig. 1. The turbine shaft 37 is directly connected through a flexible coupling 38 to the shaft of fan 34, with the opposite end of the fan shaft coupled to a speed reducer 39. As indicated, the input shaft of the speed reducer is driven at the turbine speed, while the output shaft of the reducer is connected through a V belt power transmission 40 to the pinion shaft of another speed reducer mounted upon the top of the pulverizer and operatively connected to drive the pulverizer. Thus, the fan 34 is driven at turbine speed to produce high air pressure while the pulverizer is driven at a considerably lower speed.

The pulverizer illustrated is of the general type, wherein two vertically spaced horizontally arranged circular rows of grinding balls are rotated between upper and lower grinding surfaces for the pulverization of coal therein. The pulverizer shown is of the air swept type with internal classification. Air at a superatmospheric pressure is delivered by the fan 34 to a cross manifold 41 from which ducts 41A direct air streams into the four quadrants of the pulverizer housing.

A plurality of conduits 3, 4, and 6–16', inclusive, for the discharge of coal laden air from the pulverizer housing are connected to the top of the housing at circumferentially spaced positions. They lead to the furnace burners R1–R8, inclusive, and L1–L8, inclusive (Fig. 2), while conduits 17' and 18' lead through cyclones 42 and 43 to a pulverized coal storage bin 19. A specific arrangement of this piping is hereinafter described in greater detail.

The aerator and bin assembly, including the aerating feeder and its associated pulverized coal storage bin is disclosed and claimed in our co-pending application Serial No. 554,606, filed July 12, 1944, now Patent 2,559,557 of July 3, 1951, of which the present application is a continuation-in-part. In general, the pulverized coal storage bin is defined by walls shaped as an elongated tank having rounded ends with the longitudinal axis thereof parallel to the centerline of the car. As shown, the pulverizer is installed on the locomotive car with the pulverizer fan and its driving turbine on one side thereof while the aerator and bin assembly is on the opposite side of the pulverizer, and the car. In the embodiment illustrated (Figs. 2, 6, and 7 of the drawings), cyclone type coal and air separators 42 and 43 are mounted in longitudinally spaced relationship on the top of the pulverized coal storage bin. The cyclones are arranged with tangential inlets 44 and 45 for the delivery thereto of airborne pulverized coal from the pulverizer through the coal and air pipes 17' and 18'. The pulverized coal separated from its carrier air within each cyclone discharges from the bottom of the cyclone into the pulverized coal storage bin 19. The air discharged from the cyclones passes through jumpers or ducts 46 and 47 connecting the tops of the cyclone with the interior of cylindrical casing defining the walls of the aerating feeder 48. The feeder casing is provided with a pair of outlet openings 49 and 50 in the top thereof which are connected with a corresponding pair of burners (L7 and R7) by the burner pipes 17 and 18. The aerating feeder receives pulverized coal from the storage bin 19 by means of a bulk flow conveyor 51 which is operated at a controlled speed for the delivery of a predetermined quantity of pulverized coal. The pulverized coal is aerated within the aerator feeder 48 by the passage of aerating air upwardly therethrough, so that airborne coal will be delivered from the feeder in response to the flow of air thereto.

The carrier air for the operation of the aerating feeder is supplied from a fan 52 which is driven by an electric motor 53. The electric motor drive 54 operates the oscillating mechanism (including the shaft 55 and the link 54" connecting the crank-arms 55' and 54') which is utilized to promote a flow of air into the lower portion of the mass of coal in the aerating feeder, these subject matters being more fully described in the parent application. The electric motor drive 54 is also used to operate the bulk flow conveyor 51. The two motors used to operate the aerating feeder are preferably supplied by electric power obtained from storage batteries which are maintained in a fully charged condition by auxiliary generators driven by motors operated by current from the main drive generators of the railroad locomotive. This stored electric energy source is used so as to provide for the starting of the locomotive from a shut down or cold condition without the need for a starting power source externally of the locomotive.

An additional diagram of an illustrative burner piping arrangement between the pulverizer and the furnace, the pulverizer and the aerating feeder, and the feeder and the furnace is shown in Fig. 3. Each of the pipes 3, 4, and 6–16', inclusive, is supplied with a valve (such as 71) of the type disclosed and claimed in the co-pending application of Bailey et al., Ser. No. 676,742, filed June 14, 1946 (now Patent 2,598,207 of May 27, 1952). Such valves are operated by air pressure and may be used to open and close the associated line or conduit, or to adjust the flow therethrough.

In the illustrated embodiment of the invention the pulverizer is provided with a total of 16 coal and air discharge pipes 3, 4, 6–16', inclusive, 17' and 18' connnected with corresponding pulverizer outlets diagrammatically shown at L1, L2, L3, L4, L5, L6, L7, L8, R1, R2, R3, R4, R5, R6, R7, and R8 in Fig. 3 (the burners connected and served thereby having corresponding indicia). Two of these outlets (R7 and L7) are connected with the tangential inlets 44 and 45 of the aerator cyclones 42 and 43 by the pipes 17' and 18'. The other 14 outlets are connected with individual burners of the furnace by primary air and coal pipes. The burners are installed in two like groups on opposite sides of the longitudinal boiler drum 36 which extends over the upper portion of the furnace. Thus, the burners supplied directly from the pulverizer are divided into two groups of 7 each. These groups are indicated as R and L in Figs. 2 and 3. In each group burners 1–6, inclusive, and 8 are thus supplied directly from the pulverizer.

As disclosed and claimed in our co-pending application Ser. No. 86,171, filed April 28, 1953 (now Patent 2,636,483), the burners, in general, are arranged to project substantially vertical streams of carrier air and coal downwardly toward intertube spaces between roof tubes of the furnace. The coal and carrier air streams intersect and impinge upon secondary combustion air within the area above the tubes so that the fuel and air is substantially mixed upon entering the furnace through the intertube spaces. Preferably, the secondary combustion air is preheated to increase the rate of flame propagation. For this purpose an air heater (not shown) is provided to heat the air by indirect heat exchange with the flue gases exhausted from the locomotive boiler. The secondary air is maintained at a superatmospheric pressure by a forced draft fan with the flow of air controlled by suitable dampers (not shown) which may be regulated by a mechanism as hereinafter described.

The heater also serves as a source of heat for the primary combustion air which is delivered to the valved inlet duct of the pulverizer fan. Preheated air is desirable for use in the pulverizer to dry the raw coal delivered to the pulverizer during coal pulverization, but the temperature of the coal and air stream leaving the pulverizer is regulated for best combustion and drying results as well as for pulverizer reliability. A desirable coal and air discharge temperature is approximately 150° F. Such a temperature may be maintained by a controlled dilution of the heated primary air with cold air which is added at a position adjacent the inlet of the pulverizer fan. The temperature regulation is accomplished by damper regulation of the cold air intake in response to changes in the temperature of the coal and air in the top of the pulverizer.

With the described arrangement of pipes, each of which (with the exception of lines 17 and 18) is provided with a control valve (such as 71), the pulverizer can be operated to deliver coal laden air to 14 burners, or any lesser number of burners. This operation will occur with valves L7C and R7C (Fig. 4) closed. With these valves open, coal and air will be directed through the pipes 17' and 18' to the cyclones at the top of the aerating feeder storage bin or tank. If the storage space of the tank is empty, or substantially so, coal separated from the coal and air streams delivered to the cyclones will be deposited in the tank, while the separated carrier air will be vented through the jumpers or cross-over connections 46 and 47 of the housing of the feeder and thence through the pipes 17 and 18 to the burners R7 and L7. When the storage space has been filled with pulverized coal the valves L7C and R7C may remain open, since the coal will not be separated from its carrier air in the cyclones and the pipes will deliver airborne coal to the burners with substantially the same density as the airborne coal delivered directly to the other burners from the pulverizer.

The rate of pulverized coal delivery to the furnace is automatically regulated in accordance with the variations of a number of factors, one of which is steam pressure in the locomotive boiler. This is accomplished by control apparatus, such as that shown in Fig. 8, including a controller transmitting a controlling pressure to a pneumatic power piston 57.

As an increase in steam delivered by the boiler lowers the steam pressure, the resultant lowered pressure transmitted to the controller 58 will affect it and result in its transmittal of a modified loading pressure through the line 64 to the operating piston of the primary air main burner control drive 57 to open the primary air control valve in the inlet (or outlet) of fan 34. This results in an increase in the supply of fuel to the burners and a resultant increase in steam generation.

The control system of Fig. 8 also otherwise affects fuel supply to the burners as described hereinafter.

With the air flow to the pulverizer regulated in accordance with variations in steam pressure, the feed of raw coal to the pulverizer is controlled proportionately therewith by the ratio feeder controller 59. This controller involves two diaphragm elements 59A and 59B working in opposition to each other. The diaphragm 59A is actuated by the drop in air pressure through the pulverizer, which varies with the quantity of coal in the pulverizer and air flow therethrough. The diaphragm 59B is operated by the air pressure differential developed, for example, by an orifice plate in the primary air supply duct. This indicates the rate of flow of primary air. This controller is utilized as indicated in the patent— 1,965,643 to Hardgrove—July 10, 1934. The ratio of these pressure differentials is used to regulate the feed screw steam engine control valve 61Z to vary the speed of engine 61 causing a greater or lesser amount of raw coal to be delivered to the pulverizer.

Thus, in operation, if the power requirements of the locomotive call for additional steam, the decrease in steam pressure will cause the opening of the primary air control damper to effect an increased flow of air through the pulverizer. With the increased flow of air, the pulverizer feeder controller will increase the flow of raw coal to the pulverizer in proportion to the increased air flow so that a corresponding amount of pulverized coal is delivered to the burners to maintain a predetermined primary air to coal ratio delivered.

Simultaneously with an increase or decrease in the amount of coal delivered by the pulverizer, a secondary air control drive actuated by the steam pressure and steam flow-air flow recorder controllers such as 58 and 62 will increase or decrease the flow of secondary air to the burners in step with the primary air flow. In Fig. 8, such controllers are connected by power piston 63' to a secondary air damper control drive through the lines 63, 67, relay 68, averaging relay 69, and hand auto selector valves 69' and 70. With the controllers described, the primary and secondary air delivered to the burners will be in the proper ratio to the amount of pulverized coal also delivered to the burners. In this manner, proper combustion conditions are assured in the furnace throughout the entire range of pulverizer operations.

Figure 8:
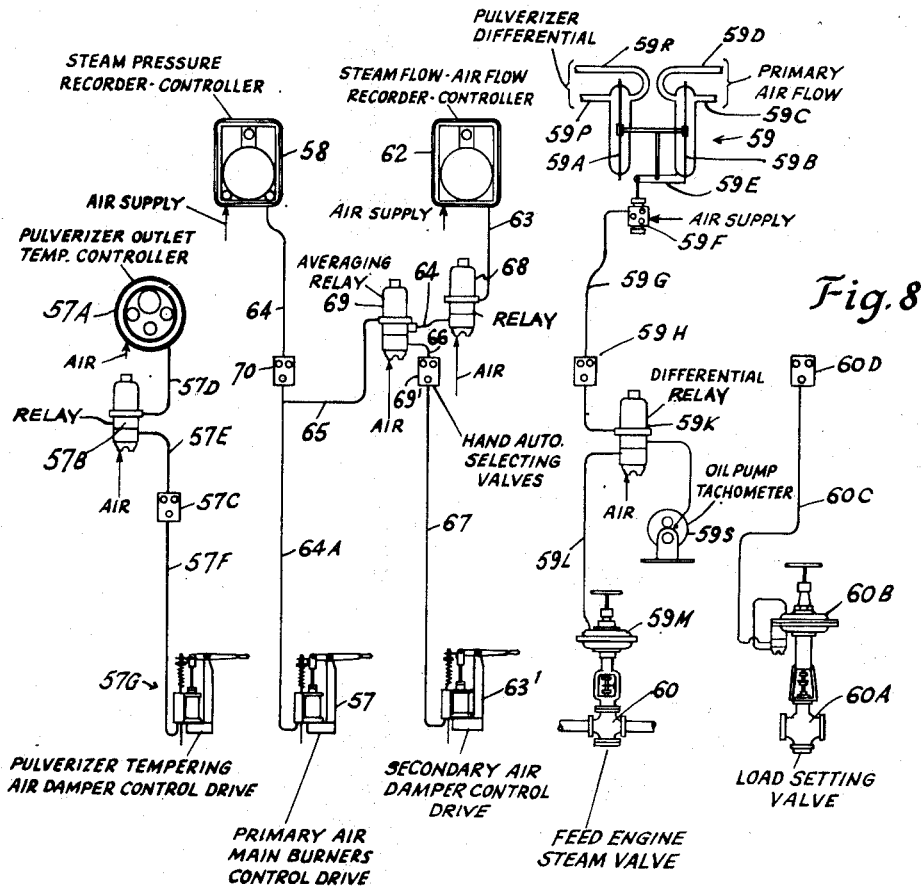
Fig. 8 is a diagrammatic view showing the arrangement of the elements of a system involving means for controlling the operation of the steam generator from a plurality of variable operative factors.

The pulverizer outlet temperature controller 57A, in Fig. 8, is connected in a known manner to a thermally responsive element disposed in the pulverizer outlet, and this controller may be set so as to maintain the temperature of the air and fuel mixture in the pulverizer outlet at a desired value. For example, such value has been found to be 150° F. under certain conditions, and the controller 57A operates through the relay 57B and the hand-auto selector valve 57C and the connecting lines 57D, 57E, and 57F to operate the tempering air damper control drive 57G. The latter is directly connected by appropriate connections to the tempering valve 57H (Fig. 2) in a branch line 57K connected to the inlet conduit 57M of the primary air fan 34. The branch line 57K is connected to the forced draft discharge or other air source for admitting controlled amounts of lower temperature atmospheric air to maintain the temperature in the pulverizer outlet at an optimum value. The relay 57B is a known control device for varying the loading in the lines 57E and 57F which are connected to control element for the tempering air damper control drive 57G. These variations take place in response to temperature variations the effect of which is transmitted through the controller 57A to the standatrol 57B.

The steam pressure recorder-controller 58 is a known controller element which has a tubular connection to the stream line from the boiler to the main turbine or other prime mover. It operates through the fluid lines 64 and 64A and the selector valve 70 to control the operation of the primary air control drive 57. The steam-flow air-flow recorder controller 62 is a known unit of control systems and on the steam side has tubular connections to the upstream and downstream sides of an orifice disposed in the steam line. For registering variations of air-flow, this unit may be connected to positions within the furnace to register indications of pressure drop in the furnace gases from a position preferably near the gas inlet of the furnace to a position near or in the gas outlet. These indications of gas pressure drop afford a direct indication of air flow. The unit 62 balances the above indicated conditions to vary the control air flow in the line 63 leading to the relay 68. This relay is operative through the line 64 connected to the averaging relay 69 to effect, through the lines 66 and 67, the loading on the control drive 63' for the secondary air damper control drive. The output of relay 69 is also modified by the loading in line 65, representing steam pressure changes.

The diaphragm 59B of the pulverizer differential controller 59 is exposed on one side through the line 59C to the primary air pressure on one side of an orifice in the primary air line and through a duct 59D it is exposed to the pressure condition on the opposite sides of the same orifice in the same line. This pressure drop measures the primary air flow which is effective through the control components 59E, 59F, 59G, 59H, 59K, 59L, 59M, upon the control valve 60 in the steam line leading to the feeder engine. The effect of the diaphragm 59B is also modified by changes in pressure differential through the pulverizer as exerted upon the diaphragm 59A through the lines 59P and 59R. The combined effect of the two diaphragms is exerted through the balancing lever 59E and its appropriate connections upon the control air loading through the line 59G and 59H to the relay 59K, which, in turn, controls or regulates the loading air to the valve operator 59M through the line 59L, a balancing influence being exerted by the oil pump tachometer 59S upon the relay 59K and the loading changes in the line 59L.

The load setting valve 60A is effective through the control component 74B of Fig. 4 to control the combustion system to maintain a desired steam pressure and optimum burner operation by coordinating the number of burners with variations in primary air effected by other elements of the control system. The load setting valve 60A is controlled by the valve operator 60B which, in turn, is controlled in response to changes in the air loading in the line 60C leading from the hand-auto selector valve 60D.

A diagram of the control system for the burner conduits is illustrated in Fig. 4. This system is arranged to control the number of burners in service at various capacities, and to regulate the charging of the aerating feeder storage tank during operation of the pulverizer. Each of the burner conduits is supplied with a rubber bag type of valve such as disclosed in the parent patent application, above identified, and indicated at 71 in Fig. 5. Each of these valves is arranged to close the flow passageway through a pipe by inflation under air pressure. With application of air to the valve, the rubber bag expands to completely shut-off all fluid flow. Since these valves are operated by air pressure the control arrangement shown in Fig. 4 is also arranged to supply air to the valves for closing, or opening the valves by venting them to the atmosphere.

The air and fuel mixture flow in pipes 17' and 18', Fig. 3, leading from the pulverizer outlets L7 and R7 to the aerating feeder and used to supply storage coal to the feeder, is controlled by means of an electrical circuit including push button 72. The push button is connected in an electrical circuit supplying a solenoid (73) operated four-way valve 73'. When push button 72 is depressed the circuit is closed through the holding relay solenoid 72''. This acts on the contacts 72A and 72B to cause the circuit through push button 72C to be held in closed condition until push button 72C is actuated to break the circuit. It also causes the circuit from the power line 72D—72E through solenoid 73, solenoid 72'', and push button 72C to be maintained closed until broken by the actuation of 72C. When the solenoid is energized by pushing button 72, the valve 73' connects a source of compressed air with the bag type valves L7C and R7C in the conduits 17' and 18' (Fig. 3) leading from pulverized outlets L7 and R7. When the solenoid is deenergized by depressing push button 72C, the valve 73' allows the air in the bag type valves to escape to the atmosphere thereby opening the conduits.

A somewhat similar solenoid operated four-way valve 74 effects the closing and opening of the bag type valves 71 in the eight conduits 16', 16, 15, 14, 10, 9, 8, and 7 of the second group, leading from pulverizer outlets L1, L2, L3, L4, R1, R2, R3, and R4. This solenoid is electrically controlled by means of the snap switch 74A arranged in parallel with the mercoid pressure switch 74B (operated by the load setting valve 60A) which will energize or deenergize the valve operating solenoid 74C in accordance with the steam output capacity of the boiler unit (by appropriate control connections).

When the push button 72 is depressed to complete electrical connections between the contacts 74D and 74E, current flows from the line component 72D through the solenoid 72″ to the line component 72E. This energizes the solenoid 72″ and causes the contacts 72A and 72B to be held in contact position with the pairs of terminals 14F and 74G, 74H and 74K. The members 72A and 72B operate as the holding contacts of a sticking relay maintaining closed circuits through the line components 72E, 74L, 74M, solenoid 73, and line component 74P. Under these conditions, the solenoid operated valve 73′ remains in the condition to which it was moved by the original operation of the solenoid 73, until the push button 72C is operated to break this circuit through the solenoid 72″.

The circuit from the power line components 72D and 72E through the line components 74R and 74S to the solenoid 74C may be completed either by the snap switch 74A or by the automatically operated mercoid pressure switch 74B.

Fig. 4 shows the valve 74 permitting air to flow from the compressed air line 74T through the valve passage 74W and line 74X to a header 74Z for the control of a valve similar to the valve 71 in each of the lines (or conduits) leading from the pulverizer outlets L-1, L-2, L-3, L-4 and R-1, R-2, R-3, and R-4, the specific arrangement of the control devices with reference to the valve for each outlet being indicated in the detail Fig. 5. Here the valve 71 for pulverizer outlet L-1, for instance, is arranged to receive compressed air from the line 74T through the valve 74, the line 74X and the header 74Z through a petcock 75A, closing the valve 71. This action takes place when the petcock 75B, connected to the opposing header 75C and the line 75D, is closed.

The lines leading from the pulverizer outlets R-1, R-2, R-4, R-5, R-6, and R-8 as grouped in the left hand portion of the Fig. 4 are subject to manual control, for instance, by the operation of one or more petcocks (for instance such as 75B) associated therewith. The operation of the automatic pressure switch 74B is intended to permit operations with the eight conduits at pulverizer capacities above a predetermined minimum. When the pulverizer capacity is reduced below this minimum, this switch will energize the solenoid 74C to cut off the eight conduits and their connected burners.

When the boiler furnace is fired only from burners supplied with pulverized fuel from the aerator, the valves L7C and R7C are closed. The aerator blower aerates the pulverized fuel and delivers it to the burners R7 and L7 through lines 17 and 18. The valves L7C and R7C remain closed until steam supplied by the boiler starts the pulverizer and until the pulverizer is warmed up. During this warming up period and the preceding steam generating period, all of the burners are in use, except L7 and R7.

After the pulverizer is warmed up, valves L7C and R7C are opened by the push button 72C and aerator storage takes place with vented air passing from the aerator chamber to burners R7 and L7. The aerator flow continues through the same path and burners R7 and L7 carry a normal coal loading. The burners R7 and L7 can be cut off by hand by the push button 72C if desired.

When the firing of the illustrative system is manually initiated, the valves L-7C and R-7C and an igniter switch are closed: the gas valves and an opening blast gate at the pulverizer fan outlet are opened and the motors 53 and 54 for the operation of the bulk flow conveyor 51 of the aerator are started. When the steam pressure has reached a value sufficient to begin pulverizer operation; i. e., 300–400 p. s. i., the operation of the pulverizer is started, and a few minutes later the operation of the aerator is stopped. About fifteen minutes later, after the air to the pulverizer has reached a sufficiently high temperature, the valves L-7C and R-7C are opened by hand and the refilling of the storage space 19 for the aerator is allowed to proceed.

At idling load and low loading pressure the disposition of the lever 110 of the multiple notch control 112 (Fig. 9) in the "Waiting" notch closes L1, L2, L3, L4, R1, R2, R3, and R4. As soon as the load picks up from the "Waiting" notch arrangement all eight burners go on. Different predetermined numbers of these burners may be caused to begin operation by a predetermined throttling of the air lines of these valves, such throttling being accomplished through the medium of the operation of the petcocks such as shown at 75A in Figs. 4 and 5. These burners may thus be caused to begin operation sequentially at intervals of a few seconds.

In the operation of the apparatus described, the aerating feeder is utilized to establish combustion in the boiler furnace and to raise the steam pressure in the boiler unit to a value of, say, approximately 400 p. s. i. This pressure is sufficient to start the turbine to drive the pulverizer. After the pulverizer has started and combustion has been established in the furnace with the pulverized coal supplied directly from the pulverizer the aerating feeder may be shut-off and the pulverizer will be used to bring the boiler unit to an operating pressure.

Ordinarily in the initial start-up of the unit, the aerating feeder burners act as torches to ignite the coal supplied directly from the pulverizer. Although the pulverizer supplies coal to only six conduits connected with the furnace during its initial starting-up period, the capacity of the pulverizer is gradually increased until it is necessary to automatically or manually cut in the additional eight conduits with their corresponding burners. In cutting in the eight conduits with their corresponding burners the snap switch 74A opens all of the bag valves simultaneously. However, each of the valves is supplied with an orifice in its air exhaust connection (exemplified by the petcock 75B and header 75C, Fig. 5) so that the rate of opening of each valve will be dissimilar from that of other valves in the same group. The purpose of this arrangement is to permit the gradual opening or closing of the valves in this group so that their actual movement is staggered. Thus, the time of opening may be arranged to extend over a period of from one to three minutes. This serves to eliminate drastic and sudden changes in the pulverizer capacity and in the amount of fuel supplied to the furnace.

During the normal operation of the locomotive boiler steam requirements will vary over a fairly wide range. This capacity range is generally within the maximum and minimum capacity limits of the pulverizer and it will not be generally necessary to operate the pulverizer on an intermittent basis. In a similar manner, the number of conduit connections to the burners need not be changed beyond the burner grouping described above, wherein either all burners are in operation at high capacities, or a group of six burners is in operation at the lower capacities.

During the period of pulverizer operation and up to a capacity of perhaps 90% of the maximum capacity of the pulverizer, the conduit connections to the aerating feeder remain open. The delivery of coal through these tube connections (such as 17' and 18', Fig. 3) to the aerating feeder will rapidly fill the storage space to the limit. When this has occurred, the coal and air entering through these conduits will not separate the pulverized coal from its carrier air due to the mass of storage coal within the cyclone, and the coal and air mixture will pass through the aerating feeder burner lines to the furnace. The coal and air delivery through these lines will have approximately the same density as the coal and air delivered through the direct connections between the pulverizer and the furnace. Thus, the aerating feeder burners will, under these conditions, operate essentially as direct fired burners. This will provide eight burners for the furnace at low pulverizer operating rates, or a total of sixteen burners serving the furnace in periods of high pulverizer operating rates, when the aerator storage space is filled. At low capacities the aerating feeder conduits can be closed if desired, so that the furnace will be served by only six burners.

In the embodiment of the invention illustrated by Fig. 10, an aerating feeder is included as an essential part of a system to supply airborne pulverized coal to a plurality of burners throughout an exceptionally wide range of coal consumption. The complete system includes a furnace with a plurality of burners, an air swept pulverizer, a separator, a unit providing a pulverized coal storage space, and an aerating feeder to regulate the required amount of coal fed from the storage space to some of the burners. The combination of elements of the complete system are advantageously arranged in a minimum of space and are so coordinated as to operating relationship that the system may be automatically operated as a storage system for a portion of its fuel demand range and as a direct fired system for another portion of its fuel demand range. Such a system is particularly advantageous in the application of pulverized coal firing to locomotive or similar furnaces which are operated intermittently and over a wide range of ratings.

Referring to the particular structure shown in Fig. 10, an air swept pulverizer 80, and a storage and aerating feeder unit 81 of the type disclosed in Fig. 6 are mounted on a railroad locomotive tender (a part of which is indicated in Fig. 1) and connected by multiple conduits with a plurality of pulverized coal burners serving the furnace 82 of a railroad locomotive.

In supplying pulverized coal to a railroad locomotive boiler furnace, the demand for fuel to meet the steam requirements for the locomotive varies over a wide range and, in operation, this demand range usually exceeds the minimum economical capacity of a steam driven air-swept pulverizer. A separator, storage reservoir, and aerating feeder, comprising unit 81, are included in the pulverized coal supply system to provide the locomotive furnace with fuel during periods of low operation, as for example: when the locomotive is stopped and is being held in a state of readiness to perform work; or during periods when the locomotive is building up pressure to perform work and sufficient steam is not available to operate the pulverizer.

As shown in Fig. 10, the pulverizer 80 is provided with sixteen outlets, each capable of delivering substantially the same fractional part of the total airborne pulverized coal discharged by the pulverizer. Of the sixteen outlets, twelve are connected by individual conduits 85 to their respective burners 83 of the locomotive furnace 82 and each conduit is provided with a shut-off valve 84.

Two of the remaining pulverizer outlets are connected by conduits 86 with the three-way valves 88 by means of which the streams of airborne coal may be selectively directed either through the conduits 90 to the storage and feeder unit 81 or through the conduits 89 to three-way valves 91. In addition, the valves 91 are connected to the unit 81 by vent conduits 93 and to the burners 92 by conduits 101. Thus, the flow path of the streams of airborne coal flowing from the pulverizer through conduits 86 may be directed through valves 88, conduits 89, valves 91 and conduits 101 directly to the burners 92; or, alternately as desired, the streams may be directed through valves 88 and conduits 90 to the storage and feeder unit 81 with the vented air flowing from the unit 81 through conduits 93, valves 91 and conduits 101 to the burners 92. The valves 88 and 91 may also be closed to prevent flow through conduits 86 and 93, when desired.

The two remaining pulverizer outlets are connected through the conduits 87 to the unit 81 and each of these conduits is provided with a shutoff valve 94. Vent conduits 98 with shutoff valves 99 provide the unit 81 with venting capacity required when the conduits 87 are discharging their streams of airborne pulverized coal to the unit 81. Conduits 98 discharge through vent connection 100 to the furnace where the vented air is utilized in the combustion of pulverized coal introduced through other conduits. A pair of conduits 95 connect directly to the upper portion of the aerating feeder chamber of unit 81. When the aerating feeder is in operation these conduits direct streams of airborne pulverized coal through open valves 96 to furnace burners 97.

Under normal conditions of locomotive operation the pulverizer will supply airborne coal to the burners 83 and 92 with all of the valves 84 open and with valves 88 and 91 directing a flow of the air-coal mixture serially through conduits 89 and 101 to the furnace. During the same period the aerating feeder 81 will be idle, valves 94 and 99 will be open, and valves 96 will be closed. With this arrangement of the valves, a flow of airborne coal is directed to the unit 81 wherein coal and air will be separated, the coal deposited within the storage space, and the separated air vented to the furnace through conduits 98. Valves 94 and 99 will remain open during the period of normal locomotive operation even though the storage space may become filled. As the pulverized coal accumulates in the storage space and the level of that coal approaches the inlet to vent connections 98, a gradually increasing percentage of the coal delivered to the unit 81 will be vented with the air through the conduits 98 and discharged to the furnace 82 wherein it is combined with other air and coal for combustion.

Preferably, the control system automatically regulating the pulverizer and the feeder unit 81 responsive to steam pressure will be adjusted to change the rate of pulverizer output in response to a variation in steam pressure between selected maximum and minimum values. At some predetermined minimum pulverizer capacity the control will stop the pulverizer and start the aerating feeder with a simultaneous automatic reversal of valves 94, 96, and 99 so that valves 94 and 99 are closed and valves 96 are opened. The valve movement may be obtained by a pair of electrically controlled and interlocked, pneumatic power units 102 connected with the several valves by the linkages 103. During periods when the pulverizer is idle, the valves 84 will remain open and since the pulverizer fan will also be idle, there will be no flow through conduits 85, either toward the burners 83 or toward the pulverizer 80. As the locomotive load again is increased above the predetermined minimum pulverizer capacity, the pulverizer will be started and, after a delay of 5 to 10 seconds, the aerating feeder will be stopped and the valves 94, 96, and 99 will again be changed to their previous positions. Overlapping periods of operation of both the pulverizer and feeder are contemplated in the interests of maintaining combustion within the locomotive furnace during the time necessary to bring the pulverizer and its fan up to an operating speed.

When the locomotive has been idle for an extended period and steam is not available within the locomotive boiler, the aerating feeder will be especially useful to generate steam in the boiler and to bring the pressure to an operating value sufficient to start the pulverizer drive. This procedure is possible due to the inherent low power requirements of the feeder and the feasibility of operating that unit by means of electric power obtained from storage batteries. Such batteries may be carried by the locomotive and they may be kept in a charged condition by the ordinary operation of the locomotive.

As an emergency measure dictated by the amount of coal stored in the unit 81 and by the anticipated future load requirements of the locomotive, the coal storage charging rate may be increased by manual adjustment of valves 88 to direct the airborne coal flowing through conduits 86 to the aerating feeder storage space and by adjusting valves 91 to permit the separated air to flow to the burners 92 through conduits 93 and 101. This result may be attained during the normal operation of the locomotive, provided the pulverized coal delivered by the twelve burners 83 is sufficient to maintain the required steam pressure, and also during periods when the pulverizer would normally be idle. In the latter case, a majority of the valves 84 would be manually closed, as for example ten of the twelve valves, and the pulverizer operated at its minimum capacity. Thus, two-thirds of the total pulverized coal prepared in the pulverizer would be diverted to the unit 81 for storage while one-third of the coal would be delivered to the locomotive boiler. This emergency charging of the storage space of unit 81 could be continued as long as desired, even though it might be necessary to operate the pulverizer intermittently to prevent an excessive generation of steam in the locomotive boiler.

As a further emergency measure, as for example under unusual conditions when the locomotive peak steam demand is in excess of the maximum coal preparation capacity of the pulverizer, the valves 94 and 99 could be closed, valves 88 and 91 adjusted to direct airborne coal through conduits 89 and 101 to burners 92, and valves 96 opened so that both the pulverizer and the feeder could be operated at full capacities for a period of time limited by the amount of coal in the storage space of unit 81.

It is contemplated that the valve adjustments for the emergency measures outlined would be manual, while the normal operating procedure of the pulverizer and feeder in alternately serving the locomotive boiler in accordance with the steam requirements thereof would be automatic.

Fig. 11 of the drawings is intended to diagrammatically illustrate an operative procedure for the illustrative steam generating system. The line MP is intended to indicate the starting period of the system from a cold condition. The start is effected by the firing of the furnace by burners which are supplied with pulverized fuel from the aerator. At the position P, enough steam pressure (i. e., 300–400 p. s. i.) has been attained to operate the pulverizer. As the pulverizer is warmed up, six burners come into operation supplied with fuel from the pulverizer, and steam is picked up gradually to the point R.

During the next succeeding operating period, represented by the line RS, eight additional burners come into operation, also supplied with pulverized fuel from the pulverizer. During this time, two fuel conduits from the pulverizer are charging the aerator storage bin, and the remaining fourteen burners in operation develop steam flow to a value in train operating range.

Under conditions requiring steam flow greater than that during the operating period RS, the two burners previously charging the aerator are switched to receive pulverized fuel from the pulverizer so that a total of sixteen burners are operating to supply steam during the period indicated by line ST. At position T, the maximum capacity of the pulverizer is utilized. But beyond this, and for periods of maximum steam capacity, two of the sixteen burners may also be supplied with pulverized fuel from the aerator.

Fig. 12 of the drawings is intended to further illustrate the operation of the illustrative system during periods of varying steam flow, and corresponding periods of different train operative conditions. The abscissa of this figure may be proportionately divided into thousands of pounds of steam per hour, while the ordinate may be appropriately divided to indicate periods of time. Starting position from a cold condition is indicated at A, and the zone A, C, $C^1$, B is intended to indicate a zone of steam capacity in which it is not economical, or possible, to effectively operate the pulverizer (i. e., as in starting up). Under conditions within this zone the furnace must be heated by pulverized fuel supplied from the aerator and pulverized coal storage assembly.

Assuming a cold start at A, the aerator operates the burners during the operative period from A to $C^1$ until, for example, steam pressure is up to 300–400 p. s. i. During the next operative period $C^1D^1$, it is assumed that the burners supplied by the pulverizer have been in operation, and that a maximum or near maximum steam flow is provided by the steam generator.

The operative condition represented by the line $C^1D^1$ may take place during the starting of a heavy train. After the train is under way the steam requirements are lessened as indicated by the next succeeding operative period $D^1E$. Next, a hill or curve may be encountered to utilize increasing steam capacity, as indicated by line EF. Next, a long down-grade may be encountered causing the steam requirements to drop to the point G, at which the train may be stopped. The steam requirements at this position are so low that it is not economical to operate the pulverizer and the furnace of the steam generator is heated by pulverized fuel supplied by the aerator.

Figure 9:
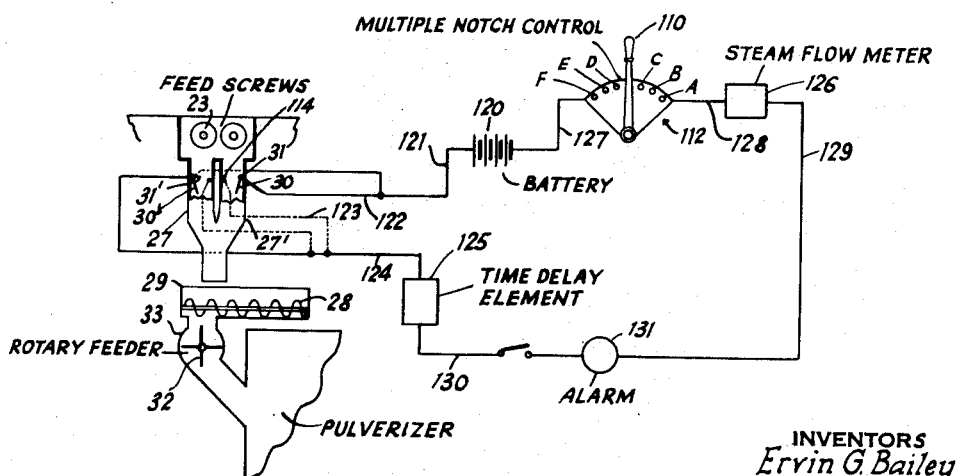
Fig. 9 is a diagrammatic view indicating a multiple notch engineman's controller and the manner in which it is connected through an alarm system to elements in the path of fuel flowing to the pulverizer to complete an alarm circuit in the event of failure of fuel flow.

Succeeding operative conditions, as indicated by the lines GH, HJ, JK, are similar to those previously described, and the operative conditions at such points as A, $C^1$, $D^1$, E, F, G, etc., may be represented by different positions of the multiple notch engineman's controller, indicated in Fig. 9 at 112.

Fig. 9 of the drawings illustrates a system by which stoppage of downward coal flow in one or both of the chutes 27 and 27' will, under proper circumstances, sound an alarm so that the engineman may take corrective measures to restore the flow of coal and thereby prevent possible stoppage of the operation of the locomotive. Such stoppage of the coal flow downwardly in the chutes 27 and 27' may take place due to the bridging of fuel over the feed screws 23 or due to the presence of tramp iron in the coal, or other causes.

When the supply of coal ceases, an alarm may be sounded from a lowering of the fuel level in the pulverizer and when such a system is used, the alarm sounds when the pulverizer level goes below a certain limit, thereupon the engineman stops the train. He throws the control lever 110 into the appropriate position along the notches A, B, C, D, E, and F which is properly connected to the burner controls to cause pulverized coal to supply such burners as L7 and R7 from the aerating tank, to hold the ignition. He then closes the primary air supply. With this control, the flow of steam would normally return to or stay on the pulverizer but the control is preferably so set that burners would be supplied with fuel from the aerating tank even when the primary air damper closes. After normal coal flow through the chutes 27 and 27' is restored by the fireman, normal firing is returned to the pulverizer with the 14 burners supplied thereby.

Further, the control system shown in Fig. 9 sounds an alarm when both coal feed screws 23 stop delivering coal for one minute (or any other proper time interval) and when steam flow is above 20,000 lbs. per hour, or the control lever 110 is in running position. The valves 30 and 30' are pivoted at 31 and 31' and are spring biased upwardly. For example, when the downward flow of coal through the chute 27' ceases, the valve 30 will pivot upwardly and make electrical contact with the terminal 114 to complete an electrical circuit from the battery 120, (or other source of electrical current) through the lines 121, 122, 123, and 124 and the time delay element 125, the multiple notch control 112, the steam flow meter 126 and the lines 127, 128, 129, and 130 to the alarm 131.

The time delay element 125 may be set to delay the sounding of the alarm for an appropriate period of time, i. e., 100 seconds so that, at minimum load, the circuit will not sound the alarm. At very low loads the position of the engineman's control lever 110, or the indicator of the steam flow meter would be below a predetermined point and would break the alarm circuit so that a false alarm will not sound. Preferably the alarm circuit will be so arranged that if one feed screw 23 stops delivering coal, a warning will be effected.

If both feed screws stop delivering coal or the rotating feeder 32 stops then the alarm will be sounded, the train will be stopped and a cycle of operations effected to restore normal operation. Such a cycle has been described above as initiated by the stopping of the train by the engineman, and the throwing of the multiple notch control 112 lever to a position to effect the flow of fuel from the aerating tank to its connected burners to hold the ignition.

With the automatic control from steam pressure, above described (Fig. 8) rising steam pressure cuts down the flow of primary air to a point where the supply of fuel to the burners will be effected from the aerator, the aerator supplied burners lighting before the primary air damper is closed tightly. In this system the aerating tank is under steam pressure control and a separate fan supplies air to the aerating tank.

In starting the train, the steam pressure is reduced to a point where the pulverizer burners come back on before the aerating burners are cut off. Thereupon, the storage space connected with the aerator is being charged and the battery to drive the fan is also automatically being charged. When a predetermined low level of coal in the storage space of the aerator is reached, the control automatically brings on the pulverizer with two burners operating from the aerator. The aerator storage is then increased to its maximum and the control is changed back automatically to two aerator burners only. The foregoing condition applies when the locomotive is standing for any considerable length of time or to such conditions as would be caused by incapacitation of the engineman or other conditions under which the main turbine should not be shut down.

During long time stops, as when the locomotive is standing for a considerable length of time in a round house or behind a wreck, or waiting for a track clearing, everything is shut down except the air compressors and the train heating line. With these conditions, the pressure in the locomotive boiler should be allowed to drop to a low value but not below the value at which the main turbine can be started. If the pressure drops below this value the control starts the pulverizer with 14 burners and brings the steam pressure back up to safety valve value. Thereupon, operation of the main turbine and the pulverizer are stopped. This cycle of operation may be repeated as many times as required. The aerator tank is kept full and the battery charged, but not used on long stops except to light up. This requires lighting up with each start of the turbine and the pulverizer. The illustrative control system also involves a low water alarm under certain conditions.

As an alternative to the alarm circuit (Fig. 9 in the drawings) the illustrative control may involve one or more electric eye devices looking into the burner box and across the ignition zone of the boiler furnace. Such a device is indicated at 200. These devices may be wired in series so that if all burners are extinguished there is an alarm. Thereupon, combustion may be restored by the automatic relighting or by other means.

While in accordance with the provisions of the statutes we have illustrated and described herein the best form of our invention now known to us, those skilled in the art will understand that changes may be made in the form of the apparatus disclosed without departing from the spirit of the invention covered by our claims, and that certain features of our invention may sometimes be used to advantage without a corresponding use of other features.

We claim:

1. The method of firing the furnace of a pulverized coal burning steam generator which comprises aerating previously stored pulverized coal burning the airborne pulverized coal at a rate sufficient to establish and maintain stable combustion conditions in said furnace, utilizing the heat of said combustion in the generating of steam under substantial pressure for prime mover operation, utilizing part of the generated steam for increasing the supply of pulverized coal delivered to said furnace by pulverizing additional coal in a pulverizing zone at a rate in excess of the utilization of stored coal, separately firing the furnace with the major portion of the pulverized coal supplied directly from said pulverizing zone to said furnace in air as a carrier and a combustion supporting medium, conveying the remaining portion of said pulverized coal from the pulverizing zone to the stored supply in air as a carrier medium, separating pulverized coal from said last mentioned carrier air to reestablish the stored supply of pulverized coal, and directing the residual air to said furnace.

2. The method of initiating and maintaining the production of steam in a steam generator heated by products of combustion of a pulverized coal fired combustion zone, said method consisting of the steps of utilizing an independent source of power energy to cause a flow of air in flotation relationship with the previously established stored supply of pulverized coal at a rate sufficient to maintain combustion after ignition in the combustion space, continuing the introduction of airborne pulverized coal from the stored supply at a controlled rate and for a period of time sufficient to generate steam at a predetermined pressure, generating prime power with the steam so generated, utilizing part of such power for the pulverization and delivery of a major part of the airborne pulverized coal directly to the combustion zone from the pulverizing zone and thereby separately firing the combustion zone at a rate in excess of the utilization of stored pulverized coal, and transferring a minor portion of the airborne pulverized coal from the pulverizing zone to a separating zone to reestablish the initial stored supply of pulverized coal while maintaining the production of steam by the combustion of the major portion of the coal being pulverized.

3. A method of firing the furnace of a pulverized coal burning steam boiler which comprises, aerating pulverized coal from a previously stored supply, feeding the aerated pulverized coal to a combustion zone, effecting combustion of the aerated and previously stored pulverized coal, generating high pressure steam for power purposes from the heat of said combustion, utilizing the high pressure steam to generate power, utilizing part of the generated power to initiate the pulverization and aeration of additional pulverized coal, directly firing the furnace with a major part of said additional pulverized coal, generating high pressure steam by the absorption of heat from the direct firing of the additional coal to operate the boiler under normal load, the last named steam generation being effected at capacities far above the maximum capacity resulting solely from the aerating and feeding of the previously stored coal to the combustion zone, directing the residual part of the additional pulverized coal to the storage zone, and de-aerating the residual pulverized coal for replenishing said previously established storage supply.

4. In combination, a steam generator having a pulverized coal fired furnace, a multiplicity of pulverized coal burners for firing the furnace, an air swept pulverizer, an aerating feeder unit with an associated storage tank for pulverized coal, means independent of the pulverizer operation for driving or operating the aerating feeder unit, a multiplicity of pulverized coal supply valved conduits connecting the outlet of said pulverizer with said burners, conduit means connecting the outlet of said pulverizer with the storage tank of said feeder unit, other valved conduits directly connecting said feeder with other individual burners to fire the steam generator from fuel from the feeder only, and a control system operatively associated with the valves of said conduits and with the steam supply system to vary the number of burners fired in accord with the steam demand upon the steam generator after the establishment of combustion in said furnace by firing resulting only from fuel supplied from the aerator feeder, the maximum number of burners subject to control of said system including both the burners directly fired from the pulverizer and the burners fired by direct supply of pulverized coal from the aerator feeder.

References Cited in the file of this patent

UNITED STATES PATENTS

| Number | Name | Date |
|---|---|---|
| 120,007 | Smith | Oct. 17, 1871 |
| 666,862 | Emerick | Jan. 29, 1901 |
| 804,160 | Neville | Nov. 7, 1905 |
| 993,928 | Welton | May 30, 1911 |
| 993,929 | Welton | May 30, 1911 |
| 1,559,220 | Caracristi | Oct. 27, 1925 |
| 1,562,411 | Caracristi | Nov. 17, 1925 |
| 1,723,957 | Stevenson | Aug. 6, 1929 |
| 1,725,202 | Sockett | Aug. 20, 1929 |
| 1,728,929 | Ernst et al. | Sept. 24, 1929 |
| 1,745,178 | McCabe | Jan. 28, 1930 |
| 1,520,331 | Clark | Dec. 23, 1934 |
| 2,081,276 | Hubler | May 25, 1937 |
| 2,184,845 | Noack | Dec. 26, 1939 |
| 2,187,627 | Noack | Jan. 16, 1940 |
| 2,386,679 | Gray | Oct. 9, 1945 |
| 2,533,866 | Yellot | Dec. 12, 1950 |